(12) United States Patent
Mammen et al.

(10) Patent No.: US 7,336,669 B1
(45) Date of Patent: Feb. 26, 2008

(54) MECHANISM FOR DISTRIBUTING STATISTICS ACROSS MULTIPLE ELEMENTS

(75) Inventors: Neil Mammen, San Jose, CA (US); Sagar Edara, San Jose, CA (US); Mammen Thomas, San Jose, CA (US); Greg Maturi, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1025 days.

(21) Appl. No.: 10/151,774

(22) Filed: May 20, 2002

(51) Int. Cl.
*H04L 12/28* (2006.01)
(52) U.S. Cl. .............. 370/401; 370/412; 370/235
(58) Field of Classification Search ........ 370/230–238, 370/395.21, 412
See application file for complete search history.

(56) References Cited

U.S. PATENT DOCUMENTS

| | | | |
|---|---|---|---|
| 4,710,966 A | 12/1987 | Aufiero | |
| 4,893,302 A | 1/1990 | Hemmady et al. | |
| 5,257,395 A | 10/1993 | Li | |
| 5,398,315 A | 3/1995 | Johnson et al. | |
| 5,400,288 A | 3/1995 | Hashimoto et al. | |
| 5,541,852 A | 7/1996 | Eyuboglu et al. | |
| 5,598,408 A | 1/1997 | Nickolls et al. | |
| 5,715,437 A | 2/1998 | Baker et al. | |
| 5,742,180 A | 4/1998 | Dehon et al. | |
| 5,796,719 A | 8/1998 | Peris et al. | |
| 5,805,816 A | 9/1998 | Picazo et al. | |
| 5,831,971 A | 11/1998 | Bonomi et al. | |
| 5,898,689 A | 4/1999 | Kumar et al. | |
| 6,018,612 A | 1/2000 | Thomason et al. | |
| 6,047,304 A | 4/2000 | Ladwig et al. | |
| 6,163,539 A | 12/2000 | Alexander et al. | |
| 6,226,338 B1 | 5/2001 | Earnest et al. | |
| 6,275,507 B1 | 8/2001 | Anderson et al. | |
| 6,377,071 B1 | 4/2002 | Wang et al. | |
| 6,377,546 B1 | 4/2002 | Guerin et al. | |
| 6,377,587 B1 | 4/2002 | Grivnan | |
| 6,389,468 B1 | 5/2002 | Muller et al. | |
| 6,438,145 B1 | 8/2002 | Moshovich et al. | |
| 6,487,202 B1 | 11/2002 | Klausmeier et al. | |
| 6,721,271 B1 | 4/2004 | Beshai et al. | |
| 6,738,880 B2 | 5/2004 | Lai et al. | |
| 6,757,897 B1 * | 6/2004 | Shi et al. ................... | 718/102 |
| 6,782,470 B1 | 8/2004 | Berg et al. | |
| 6,804,815 B1 | 10/2004 | Kerr et al. | |

(Continued)

FOREIGN PATENT DOCUMENTS

WO   WO 99/13397   3/1999

OTHER PUBLICATIONS

U.S. Appl. No. 10/144,387, filed May 10, 2002, Maturi et al.

(Continued)

*Primary Examiner*—Duc Ho
(74) *Attorney, Agent, or Firm*—Martine Penilla & Gencarella, LLP

(57) ABSTRACT

According to one embodiment, a network is disclosed. The network includes a source device, a networking hardware machine coupled to the source device, and a destination device coupled to the networking hardware machine. The networking hardware machine receives data packets from the source device and distributes statistics data corresponding to the data packets among multiple internal memory devices.

17 Claims, 5 Drawing Sheets

U.S. PATENT DOCUMENTS

| | | |
|---|---|---|
| 6,823,409 B2 | 11/2004 | Jones et al. |
| 6,910,092 B2 * | 6/2005 | Calvignac et al. .......... 710/310 |
| 6,915,480 B2 | 7/2005 | Calle et al. |
| 6,973,036 B2 * | 12/2005 | Goetzinger et al. ......... 370/235 |
| 6,982,986 B2 * | 1/2006 | Goetzinger et al. ......... 370/412 |
| 6,985,964 B1 | 1/2006 | Petersen et al. |
| 6,987,760 B2 * | 1/2006 | Calvignac et al. .......... 370/369 |
| 7,002,965 B1 | 2/2006 | Cheriton |
| 7,110,400 B2 | 9/2006 | Hronik |
| 7,206,857 B1 | 4/2007 | Mammen et al. |
| 2001/0030961 A1 | 10/2001 | Gazsi et al. |
| 2001/0049744 A1 | 12/2001 | Hussey et al. |
| 2002/0044559 A1 | 4/2002 | Ardalan et al. |
| 2002/0048270 A1 | 4/2002 | Allen, Jr. et al. |
| 2002/0050959 A1 | 5/2002 | Buckelew et al. |
| 2002/0056025 A1 | 5/2002 | Qiu et al. |
| 2002/0071321 A1 | 6/2002 | Barrie et al. |
| 2002/0099900 A1 | 7/2002 | Kawarai et al. |
| 2002/0101867 A1 | 8/2002 | O'Callaghan et al. |
| 2002/0122424 A1 | 9/2002 | Kawarai et al. |
| 2002/0126672 A1 | 9/2002 | Chow et al. |
| 2002/0126710 A1 | 9/2002 | Bergenwall et al. |
| 2002/0145974 A1 | 10/2002 | Saidi et al. |
| 2002/0163935 A1 | 11/2002 | Paatela et al. |
| 2002/0169921 A1 | 11/2002 | Saitoh |
| 2003/0012209 A1 | 1/2003 | Abdelilah et al. |
| 2003/0053460 A1 | 3/2003 | Suda et al. |
| 2003/0063348 A1 | 4/2003 | Posey et al. |
| 2003/0067930 A1 | 4/2003 | Salapura et al. |
| 2003/0088671 A1 * | 5/2003 | Klinker et al. .............. 709/225 |
| 2003/0099194 A1 | 5/2003 | Lee et al. |
| 2003/0103507 A1 | 6/2003 | Lynch et al. |
| 2003/0112802 A1 | 6/2003 | Ono et al. |
| 2003/0189932 A1 | 10/2003 | Ishikawa et al. |
| 2003/0193936 A1 | 10/2003 | Wolkrich et al. |
| 2003/0214948 A1 | 11/2003 | Jin et al. |
| 2004/0066804 A1 | 4/2004 | Holma |
| 2005/0025140 A1 | 2/2005 | Deforche et al. |
| 2005/0132132 A1 | 6/2005 | Rosenbluth et al. |
| 2005/0141503 A1 | 6/2005 | Welfed |
| 2005/0144553 A1 | 6/2005 | Bass et al. |

OTHER PUBLICATIONS

U.S. Appl. No. 10/144,091, filed May 10, 2002, Maturi et al.
U.S. Appl. No. 10/153,137, filed May 20, 2002, Mammen et al.
U.S. Appl. No. 10/144,092, filed May 10, 2002, Maturi et al.
U.S. Appl. No. 10/151,775, filed May 20, 2002, Mammen et al.

* cited by examiner

MECHANISM FOR DISTRIBUTING STATISTICS ACROSS MULTIPLE ELEMENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to networking systems; more particularly, the present invention relates to maintaining statistics within a network router.

BACKGROUND

A router is usually designed to perform one or more basic networking tasks. One basic networking task is maintaining statistics. FIG. 1 illustrates one embodiment of a conventional router. The router includes a processor and a statistics module. The statistics module is a memory device that maintains various statistics of data switched at the router. The statistics module is typically a Static Random Access Memory (SRAM) device.

The problem with the statistics module is that four or more physical SRAM devices may be necessary to support the magnitude of statistics that are maintained. This is attributed to the high speed (e.g., 125 million packets per second) at which the router may operate.

However, SRAM devices are expensive and physically large relative to Dynamic Random Access Memory (DRAM) devices. DRAM devices, nevertheless, typically cannot operate at a sufficient speed to support statistics at the router.

SUMMARY

According to one embodiment, a network is disclosed. The network includes a source device; a networking hardware machine, coupled to the source device, and a destination device coupled to the networking hardware machine. The networking hardware machine receives data packets from the source device and distributes statistics data corresponding to the data packets among multiple internal memory devices.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A mechanism to distribute statistics across multiple memory devices in a networking hardware machine is described herein. According to one embodiment, data packets are received at each of four propulsion engines and transmitted to a policing module for flow analysis. Afterward, statistics acquired during the policing of the received packets are transmitted back to the propulsion engines from which each packet was received. Subsequently, each propulsion engine reads a statistics count from an associated memory device. The statistics counts are incremented by each propulsion engine and written back to the corresponding memory devices.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
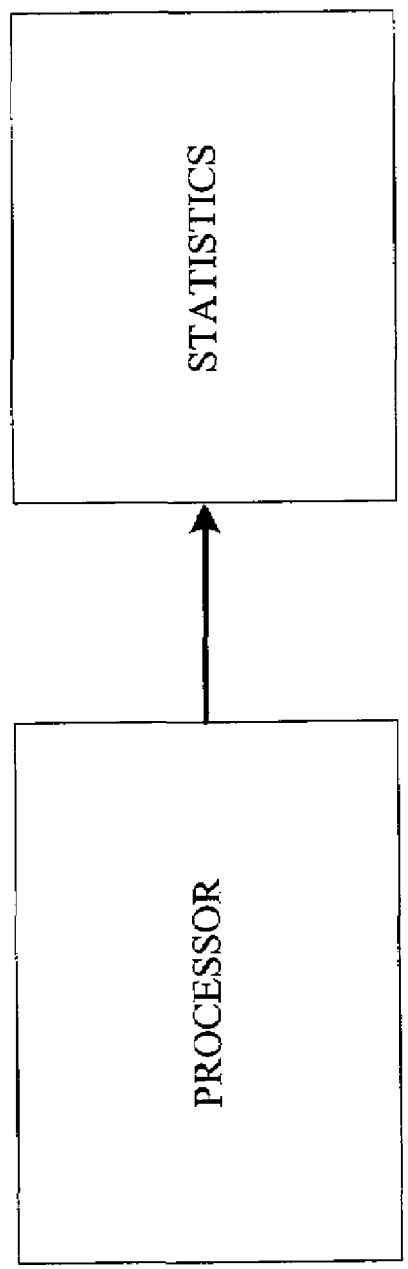
FIG. 1 illustrates an exemplary router.
Figure 2:
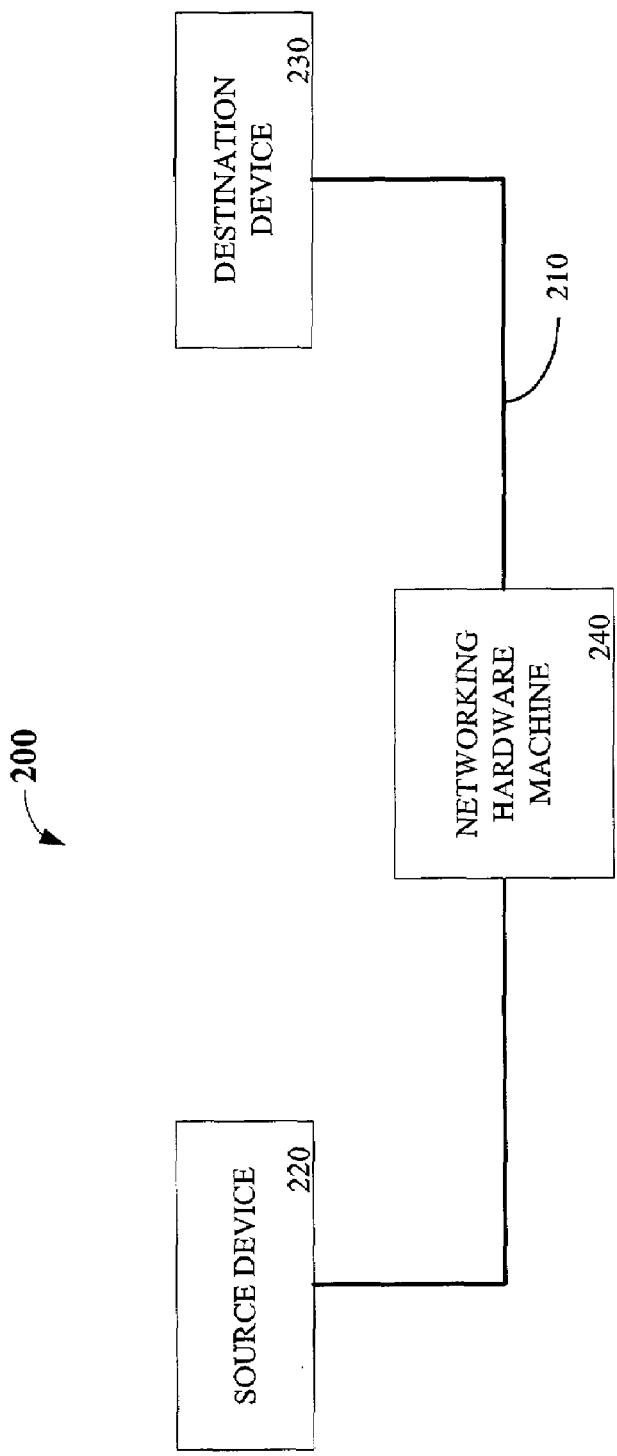
FIG. 2 illustrates one embodiment of a network.

FIG. 2 illustrates one embodiment of a network 200. Network 200 includes at least one communication link 210, at least one source device 220, at least one destination device 230, and at least one networking hardware machine 240. Communication link 210 may comprise any form of physical media layer, such as Ethernet, FDDI, or HDLC serial link.

Networking hardware machine 240 receives a set of packets from source device 220 and forwards the packets to destination device 230. In one embodiment, networking hardware machine 240 performs one or more basic networking tasks. For example, networking hardware machine 240 includes processing, classification, forwarding engine, policing and other types of components.

According to one embodiment, networking hardware machine 240 is a router. However, in other embodiments, networking hardware machine 240 may be a switch, or other device, that determines the next destination device 230 to which a data packet should be forwarded.

Figure 3:
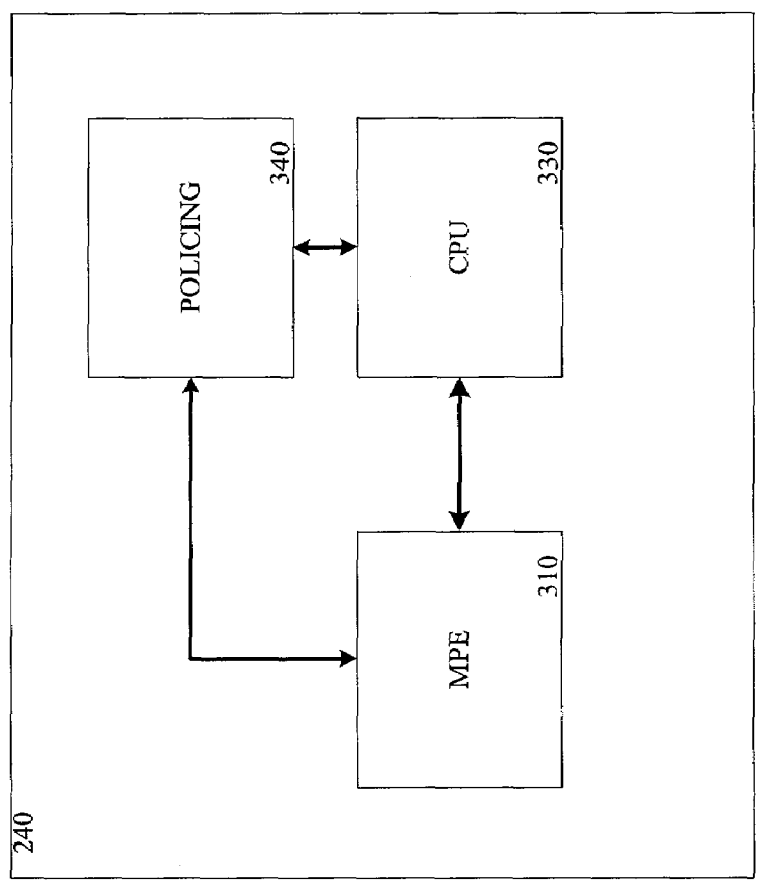
FIG. 3 illustrates one embodiment of a networking hardware machine.

FIG. 3 illustrates one embodiment of a networking hardware machine 240. Networking hardware machine 240 includes a multiple propulsion engine (MPE) 310, a central processing unit (CPU) 330 and a policing module 340. In one embodiment, the components of networking hardware machine 240 are all included within a single application specific integrated circuit (ASIC). However, one of ordinary skill in the art will appreciate that the components of networking hardware machine 240 may be implemented on two or more separate integrated circuits.

CPU 330 is a general purpose programmed computer whose function is to manage the overall operation of a networking hardware machine 240 in cooperation with other components of network 200 of which the respective networking hardware machine 240 is a part, and the transmission links 210 themselves. In addition CPU 330 may also handle all other tasks such as participating in routing protocols, resource reservation, handling packets that need extra attention, and other administrative duties.

Policing module 340 ensures that admitted traffic flows through networking hardware machine 240 adhere to the original contract of service between the network and the application. In one embodiment, policing module 340 is an SRAM device. Nonetheless, one of ordinary skill in the art will appreciate that other types of memory devices may be used to implement policing module 340.

MPE 310 is a network processing engine which processes packets as needed to support IP or ATM routing and switching. According to one embodiment, as packets are received at networking hardware machine 240 they are classified, policed, edited and then queued for scheduling to the next router in network 100. According to a further embodiment, MPE 310 operates according to a 40 Gb mode.

Figure 4:
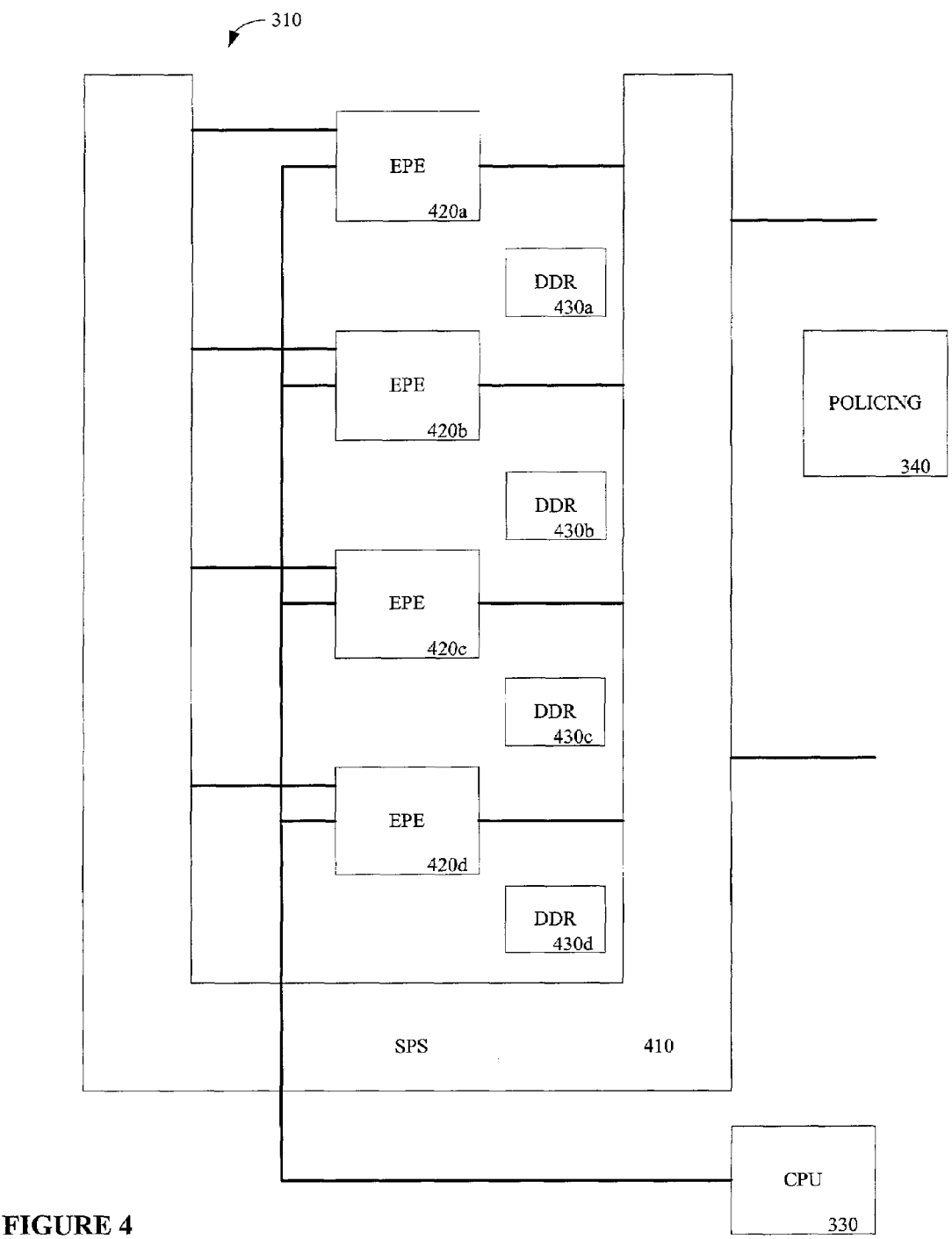
FIG. 4 illustrates one embodiment of a multi-propulsion engine.

FIG. 4 illustrates one embodiment of MPE 310. MPE 310 includes a scheduler, policer and shaper (SPS) 410, elemental propulsion engines (EPEs) 420a-420d, and dual data rate DRAMs (DDRs) 430a-430d. SPS 410 slices incoming data, packet by packet, across to each of the EPEs 420. In addition, SPS 410 uses status pins from each EPE to provide policing of the packets. The policing will determine if the packets are to be allowed into the network or dropped. Moreover, SPS 410 schedules the packets to the next router in network 100.

EPEs 420 are network processing engines that process packets as needed to support IP or ATM routing and switching. As packets are received at networking hardware machine 240, the packets are classified, edited and queued for SPS 410 to schedule the packets to the next router in network 100.

DDRs 430 are memory devices that are accessed by a respective EPE 420. For instance EPE 420a accesses DDR 430a. In one embodiment, DDRs 430 are DRAM devices. In another embodiment, DDRs 430 are Fast Cycle RAM (FCRAM) devices. However, one of ordinary skill in the art will appreciate that other types of memory devices may be used to implement DDRs 430.

Figure 5:
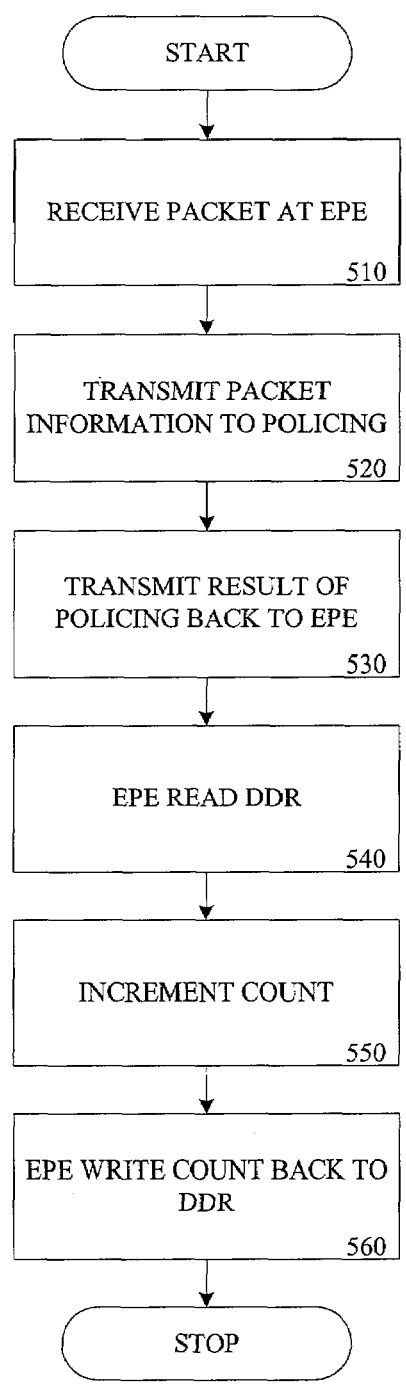
FIG. 5 is a flow diagram of one embodiment for the operation of maintaining statistics at multiple devices.

According to one embodiment, networking hardware machine 240 includes a mechanism that enables statistics data to distributed among DDRs 430a-430d. FIG. 5 is a flow diagram of one embodiment for the operation of maintaining statistics at an individual DDR 330. At processing block 510, a packet is received at an EPE 420. At processing block 520, packet information is transmitted to policing module 340.

At this point policing module 340 implements all of the policing processing, such as ensuring that the flow sent by the sender application conforms to the flow characteristics that the sender application submitted to network 200. At processing block 530, statistics obtained during the policing is transmitted back to an EPE 420 from policing module 340.

According to one embodiment, the statistics data is transmitted back to the EPE 420 from which the packet was received. However, in other embodiments, the statistics may be transmitted back to a particular EPE 420 based upon a predetermined distribution algorithm.

At processing block 540, the EPE 420 reads a statistics count from its corresponding DDR 430. At processing block 550, the statistics count is incremented by EPE 420. At processing block 560, the incremented statistics count is written back to DDR 430. Note that the above described process occurs for packets received at each EPE 420. Accordingly, the distribution of networking hardware machine 240 statistics data across multiple DDRs 430 is enabled.

In one embodiment, the statistics maintained at DDRs 430a-430d include the number of data Bytes received, the number of Bytes dropped, the number of data packets passed and the number of packets dropped. In a further embodiment, CPU 330 accesses all DDRs 430 via the EPEs 420 and combines the stored statistics data in order to calculate total statistics flow data for networking hardware 240. In yet another embodiment, CPU 330 accesses the statistics data stored in DDRs 430a-430d every five minutes.

The distribution of statistics among multiple DDRs enables the use of smaller, less expensive DRAM devices to store statistics. As described above, traditional high speed networking devices require several relatively large and expensive SRAM devices in order to maintain statistics. Thus, the statistics distribution mechanism reduces the manufacturing costs and size constraints of a networking hardware machine.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. An apparatus, comprising:
   a plurality of memory devices;
   a plurality of elemental propulsion engines (EPEs), each of which collects statistics for a sub-portion of packets processed by the apparatus and is in data communication with the plurality of memory devices, with the statistics being stored in one of the plurality of memory devices so that the statistics distributed among the plurality of memory devices defines the total statistical information for routing of the packets processed by the apparatus, defining a total statistics flow of data for the apparatus; and
   a processor, in data communication with the plurality of memory devices to selectively read the plurality of memory devices and determine the total statistics flow of data for the apparatus.

2. The apparatus of claim 1 further comprising a policing module coupled to transmit statistics to said plurality of memory devices concerning results of policing processing by the policing module.

3. The apparatus as recited in claim 1 wherein the processor reads the plurality of memory elements periodically.

4. The apparatus as recited in claim 1 wherein the processor reads the plurality of memory elements every five minutes.

5. The apparatus of claim 1 wherein each of the plurality of EPEs is coupled to one of said plurality of memory devices that contains statistical information concerning policing processes of packets received by the policing module from one of the plurality of EPEs coupled thereto.

6. A networking hardware machine, comprising:
   a policing module; and
   a multiple propulsion engine (MPE), coupled to the policing module, that distributes statistics data received from the policing module among multiple memory devices, with the MPE comprising a plurality of elemental propulsion engines (EPEs) and a plurality of dual data rate dynamic random access memories (DDRs), each coupled to a corresponding EPE, that stores statistics data received from the policing module.

7. The networking hardware machine of claim 6 wherein each EPE receives statistics data from the policing module and updates the statistics data within the corresponding DDR in response to receiving the statistics data.

8. The networking hardware machine of claim 7 further comprising a central processing unit (CPU), coupled to each of the plurality of EPEs, that accesses the DDRs via the EPEs in order to calculate a total statistics count.

9. The networking hardware machine of claim 6 wherein the MPE further comprises a scheduler, police and shaper (SPS) coupled to each of the plurality of EPEs.

10. The networking hardware machine of claim 6 wherein the networking hardware machine is a router.

11. A network, comprising:
a source device;
a networking hardware machine, coupled to the source device, that receives data packets from the source device and distributes statistics data corresponding to the data packets among multiple internal memory devices, the networking hardware machine further including a policing module and a multiple propulsion engine (MPE), coupled to the policing module, the MPE including a plurality of elemental propulsion engines (EPEs), and a plurality of dual data rate dynamic random access memories (DDRs), each coupled to a corresponding EPE and storing statistics data received from the policing module with the data stored in each of said DDRs corresponding to policing processes of data packets received at said policing module by said corresponding EPE from among said plurality of EPEs; and
a destination device coupled to the networking hardware machine.

12. The network of claim 11 wherein each EPE receives statistics data from the policing module and updates the statistics data within the corresponding DDR in response to receiving the statistics data.

13. The network of claim 12 wherein the networking hardware machine further comprises a central processing unit (CPU), coupled to each of the plurality of EPEs, that accesses the DDRs via the EPEs in order to calculate a total statistics count.

14. The network of claim 12 wherein the MPE further comprises a scheduler, police module and shaper (SPS) coupled to each of the plurality of EPEs.

15. The network of claim 11 wherein the networking hardware machine is a router.

16. A method, comprising:
receiving a plurality of data packets at a networking hardware machine;
distributing the plurality of data packets among a plurality of elemental propulsion engines (EPEs), each of which is associated with one of a plurality of memory devices;
processing, at each of the plurality of EPEs, packets distributed thereto, defining a sub-portion of the plurality of packets;
transmitting statistics data for each sub-portion of the plurality of data packets to the memory device associated with the EPE corresponding to the sub-portion to provide a plurality of stored statistics so that information distributed among the plurality of stored statistics defines a total statistical information for routing of the plurality of packets, defining a total statistics flow of data for the apparatus; and
selectively determining the total statistics flow of data by reading all of the plurality of memory devices having information corresponding to the sub-portion.

17. The method of claim 16 further comprising:
receiving a first of the plurality of packets at one of the plurality of EPEs, defining a first elemental propulsion engine (EPE);
transmitting the first packet to a policing module;
transmitting statistics data corresponding to the first packet to the first EPE; and
storing the statistics data corresponding to the first packet at a first of the plurality of memory devices.

* * * * *